Dec. 19, 1922.
G. W. HARNESS.
FLUID COMPUTING AND RECORDING DEVICE.
FILED OCT 24, 1921.
1,439,163
3 SHEETS-SHEET 1
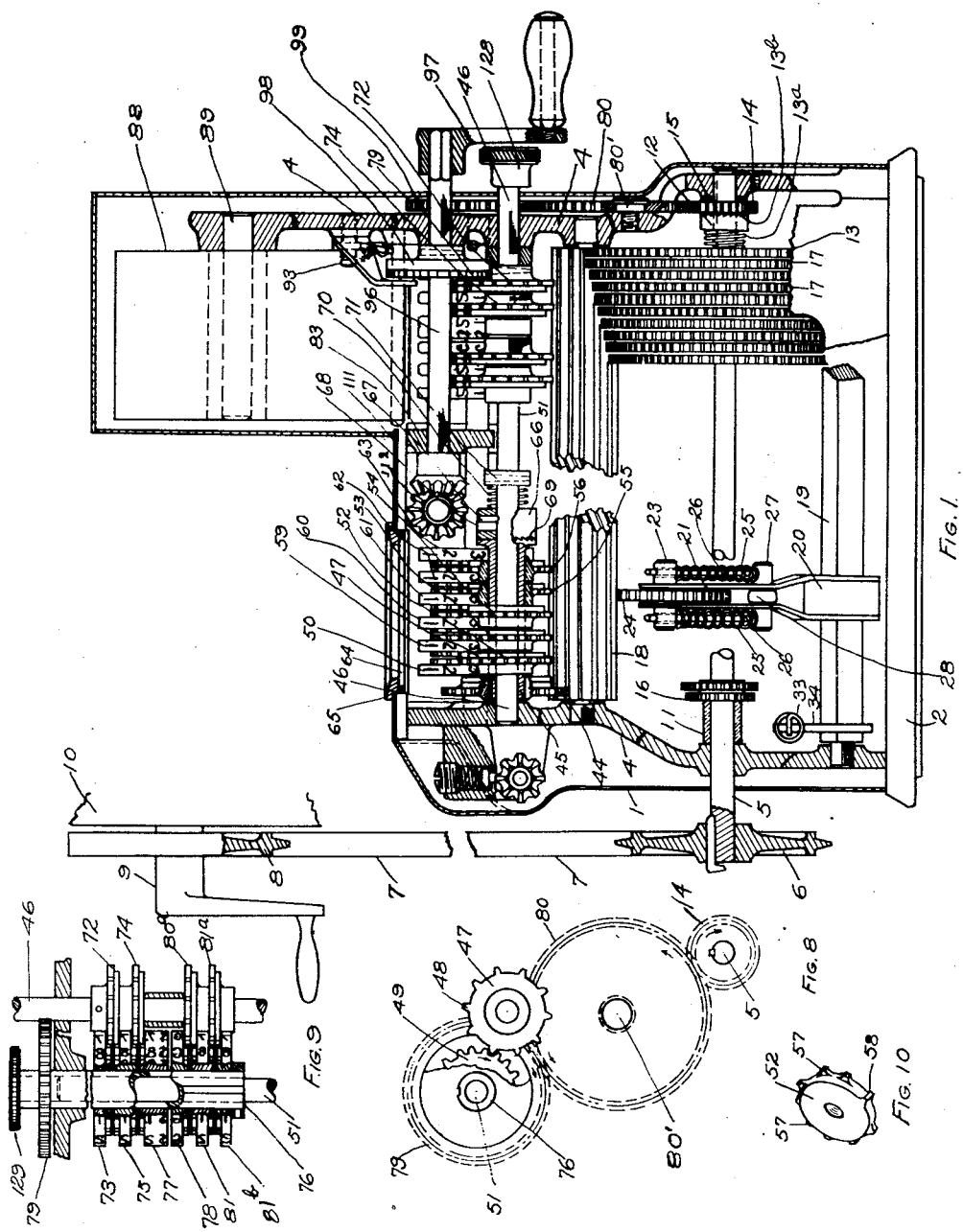
INVENTOR
George W. Harness
BY
Howard P. Smith,
His ATTORNEY Dec. 19, 1922.
G. W. HARNESS.
FLUID COMPUTING AND RECORDING DEVICE.
FILED OCT. 24, 1921.
1,439,163
3 SHEETS-SHEET 2
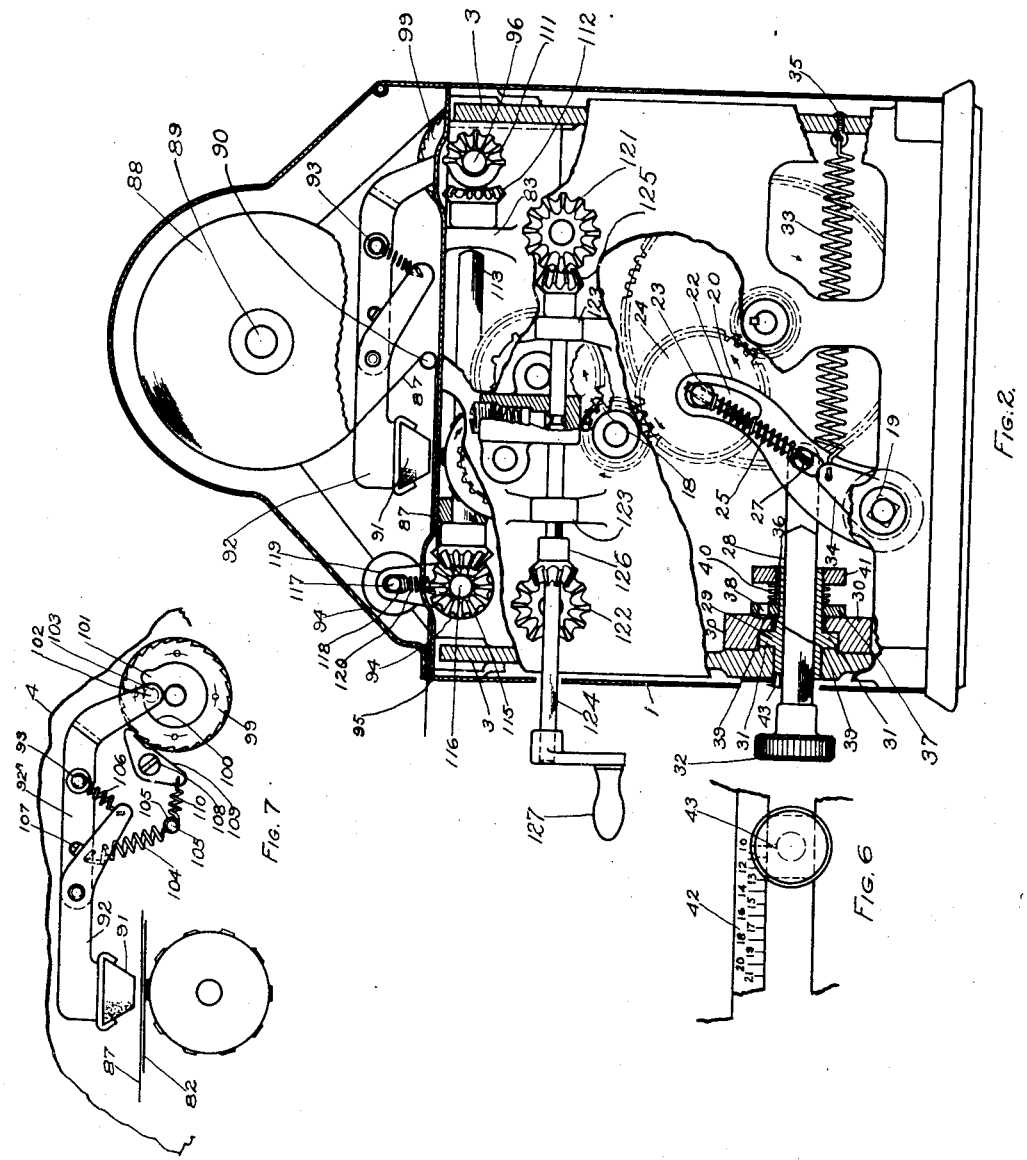
Inventor,
George W. Harness
By Howard P. Smith,
His Attorney Dec. 19, 1922.
G. W. HARNESS.
FLUID COMPUTING AND RECORDING DEVICE.
FILED OCT. 24, 1921.
1,439,163
3 SHEETS-SHEET 3
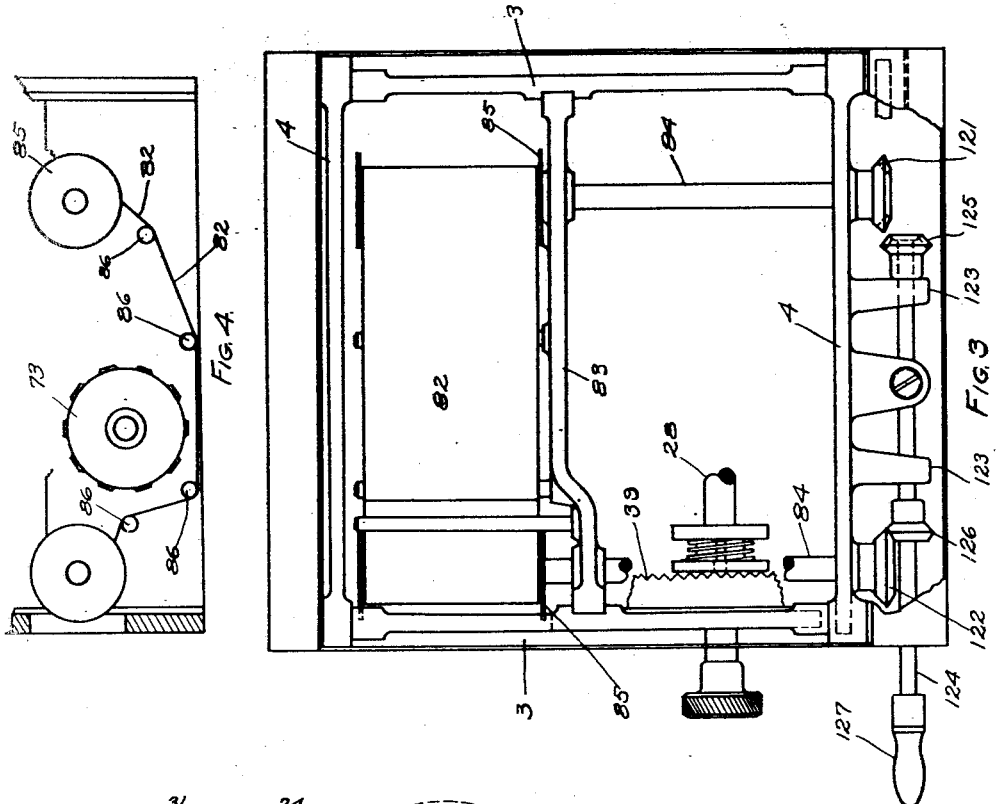
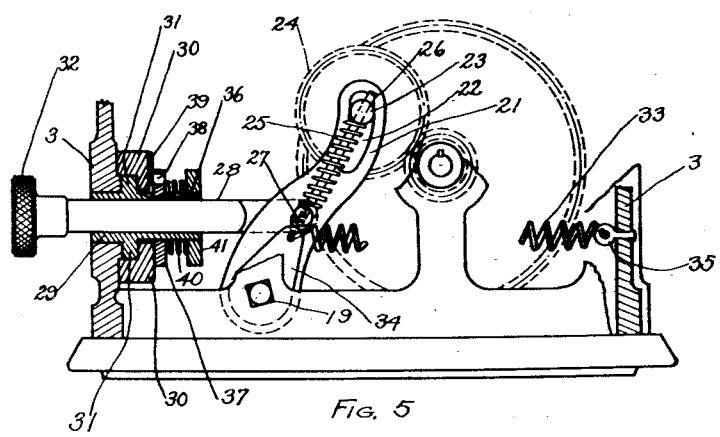
INVENTOR
George W. Harness,
BY
Howard D. Smith,
ATTORNEY Patented Dec. 19, 1922.

1,439,163

UNITED STATES PATENT OFFICE.

GEORGE W. HARNESS, OF DAYTON, OHIO.

FLUID COMPUTING AND RECORDING DEVICE.

Application filed October 24, 1921. Serial No. 510,017.

*To all whom it may concern:*

Be it known that I, GEORGE W. HARNESS, a citizen of the United States, residing at Dayton, in the county of Montgomery and State of Ohio, have invented certain new and useful Improvements in Fluid Computing and Recording Devices, of which the following is a specification.

The principal object of my invention is to provide a simple, economic and efficient device for computing and registering the total price of a designated quantity of fluid, such as gasoline, which is dispensed to a purchaser at a filling station or other place. The device dispenses with the mental calculation that is now necessary on the part of the seller to determine the total amount due for a given quantity of liquid dispensed, by providing means which will not only compute and indicate that amount, but will print the same on a ticket to be handed to the purchaser.

My device is adapted to be readily connected to a gasoline filling-station pump to compute the total amount due for each quantity of gasoline dispensed by that pump, and to indicate the same to the purchaser immediately after the operation of the pump has been completed to deliver that quantity of gasoline to an automobile, for example.

In addition to computing the amount due for each quantity of fluid dispensed, the device will register the total number of dollars and cents taken in by the seller during a given period of time, thus enabling an inspector of a number of gasoline filling stations, for instance, to see at a glance just what the proceeds of that station have been during that period of time. It is thus possible for the owner of a filling station to keep an accurate check on the man in charge, and to insure to purchasers of the fluid dispensed at that station, the means of knowing that they are not being overcharged.

Other important and incidental objects will be brought out in the following specification and particularly set forth in the subjoined claims.

In the accompanying drawings, Figure 1 is a side elevational view, partly in section, of my fluid recording and computing device. Figure 2 is an end view thereof, partly broken away and partly in section. Figure 3 is a top plan view of the same, with cover removed. Figure 4 is a side view of the printing mechanism. Figure 5 is an end view of the price changing mechanism. Figure 6 is a front view of a portion of the latter, showing the scale. Figure 7 is a side elevational view of the printer hammer and the operating mechanism therefor. Figure 8 is an end view of the mechanism for registering the number of gallons of fluid dispensed. Figure 9 is a top plan view of the printing mechanism. And Figure 10 is a perspective view of one of the toothed actuating wheels.

Throughout the specification and drawings, similar reference characters denote corresponding parts.

Referring to the accompanying drawings, the numeral 1 designates a casing constructed of suitable metal and mounted on a base 2. Mounted upon the latter within the casing 1 is a supporting structure consisting of two side frames, 3, 3 and two end frames 4, 4 suitably joined together. (See Figures 1, 2 and 3.)

Passing through holes in the lower portions of the end frames 4, 4 for free rotation therein, is a main driving shaft 5, one end of which projects through a hole in the casing 1. Keyed or otherwise secured on the outwardly projecting end of the shaft 5 is a sprocket wheel 6 around which passes a sprocket chain 7. The latter also passes around a sprocket wheel 8 suitably secured on a crank shaft 9 on a fluid pump 10. (See Figure 1.)

Mounted on the end of the shaft 5 that projects beyond the casing 1, is a spacing sleeve 11 which is restrained from outward movement by the adjacent end frame 4. Keyed for longitudinal movement on the other end of the shaft 5 is a ratchet member 12 between which and a large gear 13 fast on said shaft, is a spring $13^a$. The latter is adapted to force the ratchet member 12 into engagement with the side ratchet-tooth portion $13^b$ of a gear 14 loose on said shaft 5, and adapted to be driven from the latter through said ratchet member. Between the gear 14 and the adjacent end frame 4 there is a spacing collar 15. (See Figure 1.) Fast on the shaft 5 between the large gear 13 and a small gear 16 fast on said shaft, is a series of gears 17 that gradually increase in diameter from the gear 16 to the gear 13. This increase in diameter is so regular or uniform as to give the entire series of gears the appearance of a stepped cone. Each of the said gears corresponds to a price-per-gallon of the fluid dispensed by the pump 10, the smallest gear 16 representing, for example, a price of 10¢ per gallon, and the largest gear 13, a price of 45¢ per gallon. Therefore, as will be more fully brought out, these gears 13 to 16 inclusive are employed to change the price per gallon at which the fluid is sold, and will hereafter be referred to as change-of-price gears.

For the purpose of rotating an elongated pinion 18 journaled in the upper portions of the end frames, 4, 4 from any one of the change-of-price gears, at a speed proportioned to the size of the gear selected, the following means are provided. Referring to Figures 1 and 2, the numeral 19 designates a preferably square shaft mounted in the end frames 4, 4 below the shaft 5. Slidable along the shaft 19 is a bracket block 20 having an upwardly-projecting curved fork portion 21, in the upper portion of each section of which there is provided a curved slot 22.

Projecting through the slots 22, 22 for a vertical movement therein, is a spindle 23 on which there is loosely mounted a gear 24 for a sliding engagement with the pinion 18 and a selective engagement with any one of the change-of-price gears. The outer ends of the spindle 23 are supported by springs 25, 25 that surround rods 26, 26 which at their lower ends are threaded into a transverse pin 27 in the lower part of the fork portion 21 of the bracket block 20. At their upper ends the rods 26, 26 pass through holes in the spindle 23. (See Figures 1, 2 and 5.)

For the purpose of drawing the gear 24 out of engagement with any one of the change-of-price gears, against the compression of the springs 25, 25, and also for the purpose of moving said gear into engagement with another change-of-price gear without disengaging the former from the pinion 18, the following means are provided. Referring to Figures 1, 2 and 5, the numeral 28 designates a shifting rod which is pivotally connected at its rear end to the pin 27, and whose front end projects through a bushing 29. This bushing 29 is laterally movable in an elongated slot in the side frame 3 through which it projects, being supported at the rear during that lateral movement by guides 30, 30 suitably secured to the side frame 3. These guides 30, 30 are preferably angle pieces along which projections 31, 31 on the bushing 29, slide. Fast on the outer end of the rod 28 is a knob 32 by means of which the said rod may be easily pulled out to disengage the gear 24 from a change-of-price gear, and by means of which the said rod may thereafter be readily shifted laterally through the side frame slot and the guides 30, 30 to bring the gear 24 to the proper position to engage another change-of-price gear. The gear 24 is then drawn into engagement with the change-of-price gear selected, by a spring 33 connected between the outer end of an arm 34 mounted on the square shaft 19, and a screw eye 35 secured to the opposite side frame 3. (See Figures 1 and 5.)

For the purpose of holding the rod 28 in any position to which it may have been shifted laterally to permit the gear 24 to engage a selected change-of-price gear, the following means are provided. Slidable in a keyway 36 provided in the inner end of the bushing 29, is a collar 37 into which has been driven an outwardly projecting pin 38 that is adapted to be pressed into any one of a series of notches 39 provided in the top guide 30, by a spring 40. This spring surrounds the bushing 29 between a collar 41 fast on the inner end of the latter and the movable collar 37, to exert sufficient pressure upon the latter to force the pin 38 into the notch 39 that is opposite the change-of-price gear that has been selected for the gear 24 to engage. By these means it is possible to prevent the latter gear from sliding sidewise out of engagement with the selected change-of-price gear. Although I have provided these means for preventing such sidewise movement of the gear 24, any other means may be employed for this purpose, if desired.

Secured to the side frame 3 immediately behind the knob 32, is an elongated scale or chart 42 which contains vertical graduations that represent the prices per gallon at which the fluid dispensed by the pump 10 is sold. Each of these graduations is located upon the scale 42 directly in line with a change-of-price gear that stands for the price per gallon which is marked above that particular graduation. Now, when a projection 43 on the outer end of the bushing 29 is brought into registry with one of the graduations on the scale 42, corresponding to the price per gallon at which it is desired to sell the fluid from the pump 10, the gear 24 will have been shifted to the proper position to engage the change-of-price gear necessary to be engaged for the purpose of rotating, through said gear, the pinion 18 at the desired speed to operate the mechanism now to be described, for computing the amount due for a quantity of fluid dispensed by the pump 10 at that particular price per gallon.

Referring to Figures 1 and 2, the pinion 18 is in engagement with a gear 44 mounted above it on one end of a sleeve 45 which is loosely mounted on a shaft 46 journaled in the end frames 4, 4. Secured to one side of the gear 44 is a toothed wheel 47 having ten teeth 48 on its perimeter, for engagement with the toothed portion 49 of a counter wheel 50 loosely mounted on a shaft 51 journaled in the end frames 4, 4. Loosely mounted on the sleeve 45 behind the toothed wheel 47, is a series of toothed wheels 52, 53, 54, 55 and 56, each one of which comprises a disc having a wide perimeter on one side of which there is a series of nine teeth 57, with a tenth tooth 58 extending all the way across said perimeter. (See Figure 10.)

Each one of the toothed wheels 53, 54, 55 and 56 is in engagement, on the side of its perimeter on which its nine teeth 47 are located, with a counter wheel similar to the counter wheel 50, and like the latter, loosely mounted on the shaft 51; said counter wheels being consecutively designated by the numerals 59, 60, 61, 62 and 63. Now, when the toothed wheel 47 turns the first counter wheel 50 nine teeth, the latter will have turned the toothed wheel 52 nine teeth. Then, when the latter wheel has been turned a distance of ten teeth, the wide tenth tooth 58 thereon will have engaged and turned the counter wheel 59 one tooth. Thereafter, when the counter wheel 59 has been turned ten teeth, it will have advanced, by means of the toothed wheel 53, the counter wheel 60 one tooth, this order of advancement of the remaining counter wheels being carried out until the last counter wheel 63 has been advanced one tooth.

On the perimeter of each counter wheel the numerals "1" to "9" inclusive and the cipher "0" are placed. On the counter wheels 50 and 59 these symbols designate cents, and on the remaining counter wheels 60, 61, 62 and 63 they represent dollars. These counters therefore totalize in dollars and cents the amount of money that should be taken in for the fluid dispensed by the pump 10 during a specified period of time. This total exhibited by the counter wheels is easily visible to an inspector through a glass 64 mounted in a frame 65 secured within the top of the casing 1. (See Figure 1.)

The number of gallons, and fractions thereof, purchased by a customer, and the amount due therefor in dollars and cents, is recorded by the following mechanism. Referring to Figures 1 and 9, the shaft 46 is driven by the sleeve 45 through a ratchet member 66 secured to said shaft by a pin 67. The latter projects into a wide slot 68 in the ratchet member 66 so that the latter may be moved into and out of engagement with the enlarged toothed end 69 of the sleeve 45. The ratchet member 66 is normally held in engagement with the toothed end 69 of the sleeve, by a spring 70 which surrounds the shaft 46 between said ratchet member and a fixed collar 71 on said shaft. (See Figure 1.)

Referring to Figures 1 and 9, there is fast on the shaft 46 near the left hand end frame 4, a toothed wheel 72 in mesh with a type wheel 73. Loosely mounted on said shaft in front of the latter, is a toothed wheel 74 in mesh with a type wheel 75. These type wheels 73 and 75 are loosely mounted on a sleeve 76 that surrounds the shaft 51. Each one of the toothed wheels 72 and 74 is of the same construction as the toothed wheel 52, in that each of said wheels has nine teeth on one side of its perimeter and a tenth tooth that projects all the way across the latter. Adapted to be engaged by the tenth tooth on the toothed wheel 74, is a type wheel 77 loosely mounted on the sleeve 76, whereas the type wheel 75 is adapted to be engaged by the tenth tooth on the toothed wheel 72.

Fast on the inner end of the sleeve 76 is a "G" type wheel 78 to designate gallons. For the purpose of rotating this type wheel 78, the sleeve 76 has fast on its outer end a gear 79 in mesh with a gear 80 supported by a stud 80' secured to the end frame 4. The gear 80 is in engagement with the loose gear 14 that is turned by the ratchet member 12 on the driving shaft 5. When the latter is turned by the pump 10, it will rotate, through the gearing just described, the sleeve 76 on which the "G" type wheel 78 is fast. The type wheel 78 is in engagement with a toothed wheel 80ª loosely mounted on the shaft 46, and constructed with a wide tenth tooth like the tenth tooth on the wheel 52. The tenth tooth of the wheel 80ª is adapted to engage and turn a distance of one tooth at a time, a type wheel 81 that is in engagement with a toothed wheel 81ª loosely mounted on the shaft 46. The wheel 81ª also has a wide tenth tooth that is adapted to engage and turn a distance of one tooth at a time, a type wheel 81ᵇ loosely mounted on the sleeve 76. (See Figures 1 and 9.)

Placed on the perimeter of each of the type wheels 73 and 75 are the numerals from "1" to "9" inclusive and the cipher "0" representing cents. The same numerals, with the "0" sign, are placed on the perimeter of the type wheel 77, with the "$" sign in front of each. Provided on the perimeter of the type wheel 78, are ten "G" signs, while on the perimeter of each of the type wheels 81 and 81ᵇ the numerals "1" to "9" inclusive and the "0" sign are placed to represent the number of gallons dispensed by the pump 10 during a single transaction. It will thus be seen that when the shaft 46 is rotated by the gear 44 through the ratchet member 66, the type wheel 73 will be turned at a speed corresponding to the proportional speed at which the pinion 18 is rotated by the particular change-of-price gear that is in engagement with it. Then, when the type wheel 73 has been turned a distance of ten teeth, it will have rotated, through the toothed wheel 72, the type wheel 75 a distance of one tooth; and when the latter has been turned a distance of ten teeth, it, in turn, will have rotated, through the toothed wheel 74, the type wheel 77 one tooth. Thereafter, when the customer has secured the desired quantity of fluid, the type wheels 73, 75 and 77 will show the total amount in dollars and cents which the customer must pay for the fluid received from the pump.

The amount of fluid which the customer has received will be indicated by the type wheels 81 and 81$^b$ which are rotated by the toothed wheels 80$^a$ and 81$^a$ respectively, the wheel 80$^a$ being turned by the type wheel 78. The latter is turned by the sleeve 76 through the gears 15, 80 and 79, to place a "G" sign before the numerals printed on a tape 82 by the type wheels 81 and 81$^b$. The means for presenting the tape 82 to the type wheels 73, 75, 77, 78, 81 and 81$^b$ will now be described.

Referring to Figures 2, 3, 4, and 7, there are journaled in the right hand end frame 4 and a partition 83 extending between the side frames 3, 3 near the opposite end frame 4, two transverse shafts 84, 84. Fast on each one of these shafts between the partition 83 and the left hand end frame 4, is a spool 85 upon which the tape 82 winds.

The tape 82 as it travels between the spools 85, 85 is positioned for proper contact with the type wheels 73, 75, 77, 78, 81 and 81$^b$, by pins 86 which project toward the left hand end frame from the partition 83. (See Figures 3 and 4.)

Traveling over the tape 82, which is properly inked, is a strip of paper 87 wound on a roll 88 mounted on a shaft 89 secured in the left-hand end frame 4. (See Figures 1, 2 and 7.) In its travel through the machine, this paper 87 passes over a guide 90 immediately behind a hammer 91 preferably constructed of rubber and carried by one end of a bent hammer arm 92 pivoted at its middle portion to the front end of a lever arm 92$^a$. The latter is pivotally secured by a stud 93 to the left hand end frame 4. The paper 87 passes under the hammer 91 immediately above the type wheels before mentioned, and then between a pair of rollers 94, 94 to be hereinafter described, out through an opening 95 in the front part of the casing 1. (See Figure 2.)

The hammer 91 is actuated by the following mechanism to force the paper 87 and the tape 82 beneath it, with sufficient pressure, against the type wheels, to cause them to print distinctly upon said paper the number of gallons of fluid dispensed during a single sale and the amount due therefor in dollars and cents. Journaled in the partition 83 and the left hand end frame 4, is a shaft 96 which projects outwardly through the casing 1. The outer end of this shaft is preferably square to receive a removable handle 97. (See Figure 1.)

Fast on the shaft 96 is a disc 98 to which is secured a ratchet wheel 99 whose middle portion is cut away to form an interior circular surface 100 having a curved cam recess 101 in one portion thereof. The ratchet wheel's interior surface 100 is engaged by a pin 103 that projects inwardly from the rear end of the lever arm 92$^a$. Secured to the middle portion of the latter is one end of a spring 104 whose other end is secured to a stud 105 on the left hand end frame 4. Now, when the ratchet wheel 99 is turned by the crank 97, the recessed portion 101 in its interior surface will be brought to a position to receive the pin 103. The recessed portion 101 in the ratchet wheel's interior surface is deep enough to offer no restraint to the hammer's engagement with the paper 87. Therefore, when the pin 103 reaches the recessed portion 101 in the ratchet wheel 99, the spring 104 will exert sufficient force upon the lever arm 92$^a$ to force the hammer into sudden contact with the paper 87, to cause the type wheels to print upon it the data before mentioned.

For the purpose of making the blow struck by the hammer a resilient one, there is connected between the rear end of the hammer arm 92 and the stud 93, a spring 106 which is put under tension as soon as the hammer 91 strikes the paper, to cushion its blow upon the latter. A stop 107 is secured to the lever arm 92$^a$ to limit the return movement of the rear end of the hammer arm 92 after a blow has been struck by the hammer 91. (See Figure 7.)

For the purpose of preventing the crank 97 from being turned in a reverse direction, there is mounted on a stud 108 secured to the left hand end frame 4, a pawl 109, the nose portion of which is forced into engagement with the teeth of the ratchet wheel 99 by a spring 110 connected between the rear end of said pawl and the stud 105. (See Figure 7.)

For the purpose of issuing the paper 87 through the opening 95 in the casing 1, so that it may be torn off in strips, each of which contains the data of a single sale, the following means are provided. Referring to Figures 1, 2 and 7, there is fast on the outer end of the shaft 96, a bevel gear 111 in mesh with a bevel gear 112 fast on a shaft 113 journaled in the cross frame 83. Fast on the front end of the shaft 113 is a bevel gear 114 in mesh with a bevel gear 115 secured on a shaft 116 journaled in the partition 83 and the left hand end frame 4. Fast on the shaft 116 is the lower roller 94, the upper roller 94 being mounted on a pin 117 that has a vertical movement in a slot 118 provided in each of two brackets 119, one of which is shown in Figure 2. A spring 120 is connected between each end of the shaft 117 and the shaft 116, to draw the upper roller 94 firmly against the paper 87, to make its contact with the lower roller 94 sufficiently tight to permit the latter, when the crank 97 is rotated, to move it out through the opening 95 in the casing 1.

For the purpose of changing the direction in which the tape 82 is wound upon the spools 85, 85, the following means are provided. Fast on the outer end of the rear shaft 84, is a bevel gear 121, and on the outer end of the front shaft 84 a bevel gear 122 is secured. Slidably mounted in bosses 123, 123 that project outwardly from the right hand end frame 4, is a shaft 124 on the rear end of which there is secured a bevel gear 125, and on the front portion of which there is fixed a bevel gear 126. These bevel gears are so mounted upon the shaft 124 that when the latter is pushed inwardly the bevel gear 125 will engage the gear 121 to turn the rear spool 85 to wind the tape on it when said shaft 124 is rotated by a crank 127 secured on its front end. Now, when the shaft 124 is drawn outwardly, it will withdraw the bevel gear 125 from engagement with the gear 121, and move the bevel gear 126 into engagement with the bevel gear 122 to turn the front spool 85 to wind the tape 82 upon it. (See Figure 3.)

For the purpose of turning the type wheels 73, 75 and 77 to zero after a complete operation of the fluid pump 10, there is secured to the outer end of the shaft 46 a knob 128. The latter is adapted to be gripped by the hand to readily turn the shaft 46 in a reverse direction to that in which it is rotated by the sleeve 45. When the shaft 46 is so turned by the knob 128, it will rotate independently of the sleeve 45, by reason of its ratchet connection with the latter, to turn the type wheels 73, 75 and 77 back to zero by means of the toothed wheels 98 and 99. The type wheels 81 and 81$^b$ may be similarly returned to zero by a knob 129 fast on the sleeve 76. When this is done, the train of gearing for rotating the sleeve 76 from the drive shaft 5, will be turned in a reverse direction independently of said shaft by reason of its connection with the latter through the ratchet member 12.

In operation, when a customer has secured, for example, ten gallons of gasoline from the fluid pump 10, at a price of 10¢ per gallon, the type wheels 73, 75 and 77 will have been rotated by the shaft 46, through the toothed wheels 72 and 74, a sufficient distance to bring the "$1." symbol on the type wheel 77 and the "0" symbol on each of the type wheels 75 and 73, into a position to print "$1. 0 0" on the strip 87. These type wheels are rotated to bring this amount to the printing position, because the pinion 18 which rotates the sleeve 45 and the shaft 46, is turned by the change-of-price gear that represents "ten-cents-per-gallon," being in this instance the small gear 16. The latter is in turn rotated by the shaft 5 which is driven from the pump 10 by the sprocket mechanism described.

Also on the strip 87 there will be printed, by the type wheels 81 and 81$^b$, the designation "1 0 G," representing the number of gallons of gasoline which the customer has secured, for when the drive shaft 5 is rotated by the pump during its delivery of that number of gallons, the sleeve 76 will be turned by the gearing hereinbefore described, to rotate the type wheels 78, 81 and 81$^b$ a sufficient distance to bring the symbol "G" on the first, the symbol "0" on the second, and the numeral "1" on the third into a position to print "1 0 G" on the strip. The latter may then be forced out through the opening 95 in the casing, a sufficient distance by the handle 127 to permit the portion of the strip that contains the designations "1 0 G" and "$1. 0 0," to be torn off and handed to the customer. From the above description of the transaction, it will be seen that by the use of my device, the customer will receive a slip containing symbols representing the exact amount of fluid which he has received from the pump, and the price which he must pay therefor.

When the price-per-gallon changes, it is only necessary for the operator to move the knob 32 to the position on the scale 42 that stands for that price-per-gallon, whereupon the selective gear 24 will be moved by the mechanism hereinbefore described, to engage the particular change-of-price gear that represents the new price per gallon. Then, when the pump is again operated, the total price due for a quantity of fluid dispensed by the pump, will be computed at this new price-per-gallon.

The total amount in dollars and cents that has been received for the fluid dispensed by the pump 10 during a given period of time, for observation by the inspector, will be shown on the counter wheels 60, 61, 62 and 63, as hereinbefore described.

While I have used the term "gallon" as the liquid measure with reference to which the price of the fluid dispensed by the pump is computed, any other liquid-measure such as the liter, may be employed, if desired.

I do not wish to be limited to the details of construction and arrangement herein shown and described, and any changes or modifications may be made therein within the scope of the subjoined claims.

Having described my invention, I claim:

1. In a device of the type described, the combination with a fluid pump, of a casing, a shaft journaled within said casing, means for rotating said shaft from the pump, a series of change-of-price gears fast on said shaft within the casing totalizing means also mounted within said casing, a gear for operating said totalizing means, an elongated pinion in mesh with said gear, and a second gear adapted to be moved along said pinion into engagement with a selected change-of-price gear for the purpose specified.

2. In a device of the type described, the combination with a fluid pump, of a casing, a shaft journaled within said casing, means for rotating said shaft from the pump a series of change-of-price gears fast on said shaft within the casing, totalizing means also mounted within said casing, a gear for operating said totalizing means, an elongated pinion in mesh with said gear, a second shaft within the casing, a bracket block slidable along said shaft, and a gear pivotally mounted in said bracket block, adapted to be moved along said elongated pinion to engage a selected change-of-price gear, for the purpose specified.

3. In a device of the type described, the combination with a fluid pump, of a casing, a shaft journaled within said casing, means for rotating said shaft from the pump, a series of change-of-price gears fast on said shaft within the casing, totalizing means also mounted within the casing, a gear for operating said totalizing means, an elongated pinion in mesh with said gear, a second shaft within said casing, a bracket block slidable along said second shaft, an upper forked portion on said bracket block, each section of said forked portion containing a slot, a spindle projecting through each slot and having a hole in each of its ends, a transverse pin secured in said bracket block below the spindle, a pair of rods projecting upwardly from said pin, through the holes in said spindle, a spring surrounding each rod, to support the spindle and a gear mounted on the spindle, adapted to be moved along the pinion to engage a selected change-of-price gear, and adapted to be withdrawn from engagement with the latter by the bracket block, against the compression of said springs.

4. In a device of the type described, the combination with a fluid pump, of a casing, a shaft journaled within said casing, means for rotating said shaft from the pump a series of change-of-price gears fast on said shaft within the casing, totalizing means also mounted within the casing, a gear for operating said totalizing means, an elongated pinion in mesh with said gear, a second shaft secured within the casing, having one or more flat faces, a bracket block slidable along the second shaft, a gear pivotally mounted in said bracket block, adapted to be moved along the elongated pinion to engage a selected change-of-price gear, a rod for drawing said bracket block outwardly to disengage the gear on the latter from a selected change-of-price gear, a member through which said rod projects, laterally movable through a slot provided in the casing, a knob on the outer end of said rod, and an elongated price-per-gallon indicator secured to said casing above the slot and behind said knob, for the purpose specified.

5. In a device of the type described, the combination with a shaft, of a series of type wheels loosely mounted on said shaft, means for rotating said type wheels, a record strip adapted to travel over said type wheels, a lever pivotally mounted over said strip, a hammer carried by said lever, adapted to be forced into engagement with said strip over the type wheels a ratchet wheel, means for rotating the latter, an annular cam portion on said ratchet wheel, having a recessed part in its interior surface, a pin on the rear end of said lever, in engagement with the interior surface of the cam portion of the ratchet wheel, and a spring adapted to draw the front end of the lever downwardly when said pin enters the recessed part of the cam portion of the ratchet wheel after the latter is rotated, to force the hammer into violent contact with said strip above the type wheels, for the purpose specified.

In testimony whereof I have hereunto set my hand this 21st day of October, 1921.

GEORGE W. HARNESS.

Witness:
HOWARD S. SMITH.